United States Patent
Konya et al.

(10) Patent No.: US 6,551,567 B2
(45) Date of Patent: Apr. 22, 2003

(54) SPHERICAL SILICA PARTICLES AND METHOD OF PRODUCTION

(75) Inventors: Yoshiharu Konya, Annaka (JP); Koichiro Watanabe, Annaka (JP); Susumu Ueno, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/929,097

(22) Filed: Aug. 15, 2001

(65) Prior Publication Data

US 2002/0041963 A1 Apr. 11, 2002

(30) Foreign Application Priority Data

Aug. 15, 2000 (JP) ........................ 2000-246132

(51) Int. Cl.$^7$ ................ C01B 33/113; B32B 5/16
(52) U.S. Cl. ................ 423/337; 428/402
(58) Field of Search ............... 65/21.3; 423/335, 423/337; 428/402

(56) References Cited

U.S. PATENT DOCUMENTS

| | | | | |
|---|---|---|---|---|
| 5,611,833 A | * | 3/1997 | Brahmbhatt et al. | 65/21.3 |
| 6,054,073 A | * | 4/2000 | Kobayashi et al. | 264/15 |
| 6,312,656 B1 | * | 11/2001 | Blackwell et al. | 423/339 |
| 6,387,302 B1 | * | 5/2002 | Konya et al. | 264/15 |

* cited by examiner

*Primary Examiner*—H. Thi Le
(74) *Attorney, Agent, or Firm*—Birch, Stewart, Kolasch & Birch, LLP

(57) ABSTRACT

Spherical, non-crystalline silica particles made by burning a non-halogenated siloxane starting material are substantially halogen-free, and have a content of metallic impurities other than silicon of not more than 1 ppm, a particle size of 10 nm to 10 $\mu$m and a specific surface area of 3–300 m$^2$/g. Production of the particles is carried out by oxidative combustion of the non-halogenated siloxane in a flame at a high adiabatic flame temperature to effect the formation of a large number of core particles and promote their coalescence and growth.

9 Claims, 1 Drawing Sheet

SPHERICAL SILICA PARTICLES AND METHOD OF PRODUCTION

BACKGROUND OF THE INVENTION

1. Field of the Invention

The present invention relates to spherical silica particles useful as, for example, a filler in epoxy resin sealants for integrated circuit (IC) devices, an internal additive for toners, an abrasive, and a reinforcing filler for rubber. The invention also relates to a method of producing such particles.

2. Prior Art

Known methods for producing silica particles include the flame hydrolysis of silane compounds and the flame pyrolysis of alkoxysilane compounds.

Production by the flame hydrolysis of a silane compound generally involves heating and vaporizing a chlorosilane such as silicon tetrachloride ($SiCl_4$), feeding the vapor to a burner, and hydrolyzing the vapor in an oxyhydrogen flame to form silica particles. However, the unavoidable presence of chlorine from the silane compound in the resulting silica particles, coupled with the excessively small size of the particles and their tendency to agglomerate into secondary particles, makes the silica particles obtained by such a process unsuitable for use as a filler in epoxy resin sealants for IC devices, as an internal additive in toners, or as an abrasive.

Production by the flame pyrolysis of an alkoxysilane compound generally involves heating and vaporizing a compound such as tetramethoxysilane ($Si(OCH_3)_4$), feeding the vapor to a burner, and pyrolyzing the vapor in an oxyhydrogen flame to form silica particles. Although halogen-free, high-purity silica particles can be obtained in this way, the stoichiometric ratio of the silica formed to the silane starting material is low. As a result, the silica concentration within the flame is low, and so collisions and coalescent growth of the silica are infrequent, discouraging growth in the size of silica particles formed by the reaction into larger particles. Particles larger than 500 nm cannot be obtained by this process. An additional disadvantage is the high price of alkoxysilanes, which increases the cost of production.

SUMMARY OF THE INVENTION

It is therefore an object of the invention to provide spherical silica particles and a method for their production which overcomes the disadvantages of such prior art processes.

We have conducted investigations on producing high-purity spherical silica particles which contain substantially no halogen and have a suitable particle size by the combustion of a non-halogenated siloxane starting material. As a result, we have found that spherical, non-crystalline silica particles which contain substantially no halogen and have a content of metallic impurities other than silicon of not more than 1 ppm, a particle size of 10 nm to 10 $\mu$m and a specific surface area of 3 to 300 $m^2/g$ can be cost-effectively produced by the oxidative combustion of a non-halogenated siloxane in a flame provided that, based on the siloxane, a combustion-assisting gas and a combustion-supporting gas fed to a burner, the siloxane and the combustion-assisting gas when burned have an adiabatic flame temperature within a range of 1,600 to 5,600° C.

Accordingly, the invention provides spherical, non-crystalline silica particles which are made by burning a non-halogenated siloxane starting material, are substantially halogen-free, and have a content of metallic impurities other than silicon of not more than 1 ppm, a particle size of 10 nm to 10 $\mu$m and a specific surface area of 3 to 300 $m^2/g$.

The invention also provides a method of producing such spherical silica particles by subjecting the non-halogenated siloxane to oxidative combustion in a flame. In this method, based on the siloxane, a combustion-assisting gas and a combustion-supporting gas fed to a burner, the siloxane and the combustion-assisting gas when burned have an adiabatic flame temperature within a range of 1,600° C. to 5,600° C. According to one preferred embodiment of the method of the invention, combustion is carried out by feeding the siloxane to the burner in liquid form and atomizing it with a nozzle mounted on the burner. According to another preferred embodiment, combustion is carried out by heating the siloxane to form a vapor and feeding the vapor to the burner.

BRIEF DESCRIPTION OF THE DRAWINGS

The objects, features and advantages of the invention will become more apparent from the following detailed description, taken in conjunction with the foregoing drawings.

DETAILED DESCRIPTION OF THE INVENTION

Figure 1:
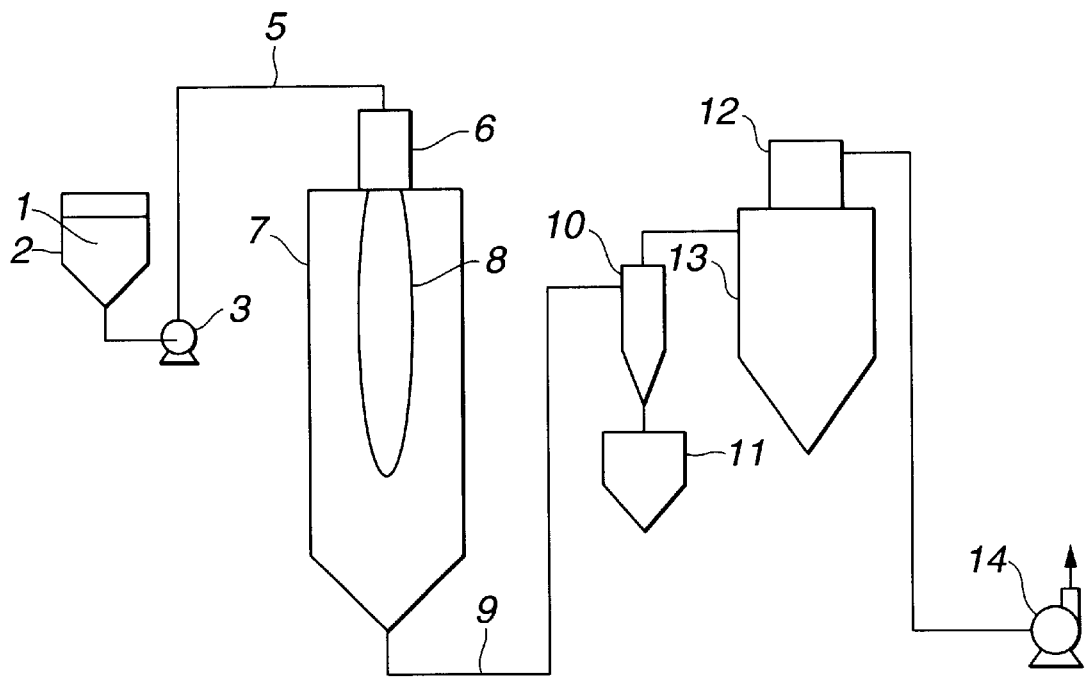
FIG. 1 is a schematic sectional view showing one exemplary reaction system used to work the present invention.

The spherical silica particles of the invention are produced by the combustion of a halogen atom-free siloxane as the raw material. These spherical fine particles of silica contain substantially no halogen atoms, and have a content of metallic impurities other than silicon (especially iron, aluminum, calcium, sodium, potassium and magnesium) of not more than 1 ppm. The particles have an average particle size of 10 nm to 10 $\mu$m and a specific surface area of 3 to 300 $m^2/g$ as determined by the BET method.

Such spherical silica particles according to the invention can be produced by a process that includes subjecting the siloxane to oxidative combustion in a flame. In this process, the siloxane is fed to a burner along with a combustion-assisting gas and a combustion-supporting gas, whereby the siloxane and the combustion-assisting gas are burned so as to have an adiabatic flame temperature within a range of 1,600° C. to 5,600° C. The siloxane may be atomized in liquid form and burned, or may instead be burned as a vapor.

Siloxanes that can be used herein include non-halogenated linear organosiloxanes of the general formula (1):

$$(R^1)_3SiO[SiR^2R^3O]_mSi(R^1)_3 \qquad (1)$$

wherein $R^1$, $R^2$ and $R^3$ are each independently a monovalent hydrocarbon group, an alkoxy group or a hydrogen atom, and m is 0 or a positive integer, cyclic organosiloxanes of the general formula (2):

$$[SiR^2R^3O]_n \qquad (2)$$

wherein $R^2$ and $R^3$ are as defined above, and n is an integer of 3 or larger, and mixtures thereof.

Examples of suitable monovalent hydrocarbon groups represented by $R^1$ to $R^3$ in the above formulas include $C_{1-6}$ alkyls, alkenyls such vinyl, and phenyl. Of these, lower alkyls such as methyl, ethyl or propyl are preferred. Methyl is especially preferred. Preferred examples of the alkoxy groups include those having 1 to 6 carbons, such as methoxy and ethoxy; methoxy is especially preferred. The letter m is 0 or a positive integer, and preferably from 0 to 100. The letter n is 3 or a larger integer, and preferably from 3 to 7.

Examples of suitable organosiloxanes include hexamethyldisiloxane, octamethyltrisiloxane, octamethylcyclotetrasiloxane and decamethylcyclopentasiloxane. These siloxanes are preferably purified compounds containing no chlorine or other halogens. Since such siloxanes are of high purity with substantially no metallic or other impurities, they are suitable as the raw material for silica particle production.

Combustion of the siloxane may be carried out either by feeding the siloxane in liquid form to the burner and atomizing the liquid with a nozzle mounted on the tip of the burner, or by heating the siloxane to form a vapor and feeding the vapor to the burner.

In the method that involves atomizing the siloxane in liquid form, atomization with a nozzle is carried out by using an atomizing medium such as air or steam, by relying on the pressure of the liquid itself, or by using centrifugal force. To achieve complete vaporization and pyrolysis, the atomized droplets should be very small. Fine droplets can be formed by making the viscosity of the liquid starting material (siloxane) at 25° C. below about 500 cs, and preferably below about 200 cs. The maximum liquid droplet size desirable differs according to the siloxane boiling point, latent heat of vaporization, thermal decomposability, and heat of combustion. However, large liquid droplets have a rapid settling velocity, preventing a sufficient residence time from being achieved. A droplet size not larger than 100 μm, and preferably 50 μm or less, is desirable to achieve a sufficient residence time. During combustion, the droplets of atomized siloxane are heated by the auxiliary flame of the combustion-assisting gas and by the siloxane combustion flame, and undergo evaporation or pyrolysis.

In the other method in which the siloxane is fed to the burner as a vapor, this may be carried out by heating the siloxane and bubbling it with an inert gas such as nitrogen for carrying the siloxane on the gas. Alternatively, a superheated vapor of siloxane may be mixed with an inert gas such as nitrogen and fed to the burner.

Combustion forms core particles of silica which coalesce and grow into particles whose ultimate size and shape are determined by the flame temperature, silica concentration, and residence time within the flame. At a low flame temperature, the particle size becomes close to 10 nm, which is about the same as that of fumed silica. Inducing the silica core particles to mutually collide and grow by coalescence into larger particles requires that large numbers of silica core particles be generated within a flame having a temperature of at least 1,423° C.—the melting point of silica, and be retained within the flame for an extended period of time. The silica concentration within the flame varies with the type and amount of siloxane starting material supplied, and is governed in particular by the type of starting material. The "silica formation ratio" is herein defined as the ratio of the amount of silica formed to the starting material in molar or weight basis, rather than stoichiometry. Then, the silica formation ratios for non-siloxane starting materials include 1 mol/mol (0.354 kg/kg) for tetrachlorosilane, and 1 mol/mol (0.395 kg/kg) for tetramethoxysilane. By contrast, the silica formation ratio for hexamethyldisiloxane, a linear siloxane, is 2 mol/mol (0.740 kg/kg), and that for octamethylcyclotetrasiloxane, a cyclic siloxane, is 4 mol/mol (0.810 kg/kg). Accordingly, the use of a siloxane rather than a chlorosilane or alkoxysilane results in a higher silica concentration and a higher silica formation ratio. That is, less starting material is required per unit of product, and the production efficiency is higher.

At a flame temperature equal to or higher than the silica melting point, the silica particles coalesce and grow, with a higher flame temperature resulting in more coalescence and growth of the particles, and thus a larger particle size. The heat of combustion differs according to the type of starting material, which has a large impact on the flame temperature. Heats of combustion for non-siloxane starting materials include 62.3 kcal/mol or 370 kcal/kg for tetrachlorosilane (in which case this value is the heat of hydrolysis), and 722 kcal/mol or 4,760 kcal/kg for tetramethoxysilane. By contrast, hexamethyldisiloxane, a linear siloxane, has a heat of combustion of 1,389 kcal/mol or 8,550 kcal/kg, and octamethylcyclotetrasiloxane, a cyclic siloxane, has a heat of combustion of 1,974 kcal/mol or 6,650 kcal/kg. Thus, siloxanes have higher heats of combustion than chlorosilanes and alkoxysilanes, making it easier to increase the flame temperature and also providing better energy efficiency.

To keep the combustion of siloxane stable and allow complete combustion to occur, an auxiliary flame is formed using a combustion-assisting gas. The combustion-assisting gas used here is preferably one which does not leave unburned residues following combustion. Suitable, non-limiting examples include hydrogen and hydrocarbon gases such as methane, propane and butane. The way of forming auxiliary flame is not critical, and the auxiliary flame may be formed either by feeding the combustion-assisting gas to the main burner or by an independent burner. However, a large amount of combustion-assisting gas results in the formation of combustion by-products such as carbon dioxide and steam, increasing the amount of combustion exhaust and reducing the silica concentration during combustion. Accordingly, the amount of combustion-assisting gas is typically set at not more than 2 moles, and preferably from 0.1 to 1.5 moles, per mole of siloxane starting material.

Moreover, a combustion-supporting gas is added at the time of combustion. The combustion-supporting gas may be any oxygen-containing gas, such as oxygen or air. If the net amount of oxygen in the gas is insufficient, combustion of the siloxane and the combustible gas used in the auxiliary flame (combustion-assisting gas) is incomplete, leaving carbon residues in the finished product. On the other hand, if a greater than stoichiometric amount of combustion-supporting gas is used, the silica concentration within the flame decreases and the flame temperature falls, which tends to suppress coalescence and growth of the silica particles. Supplying a large excess of the combustion-supporting gas results in the incomplete combustion of the siloxane, and excessively increases the load on powder collecting equipment in the exhaust system. Supplying combustion-supporting gas which contains a stoichiometric amount of oxygen allows the highest flame temperature to be achieved, but combustion tends to be incomplete. A small excess of oxygen is required to achieve complete combustion. Accordingly, it is advantageous for the combustion-supporting gas fed from the burner to include an amount of oxygen which is 1.0 to 4.0 times, and preferably 1.1 to 3.5 times, the stoichiometric amount of oxygen required for combustion. In addition to gas fed from the burner, the combustion-supporting gas may be supplemented by outside gas taken in along the burner.

The size of the silica particles formed from combustion can be adjusted by varying the flame temperature, silica concentration and residence time within the flame. In the present invention, control of the flame temperature is achieved in particular by controlling the adiabatic flame temperature based on the siloxane, combustion-assisting gas and combustion-supporting gas which are fed to the burner. "Adiabatic flame temperature," as used herein, refers to the highest temperature attained by combustion products and unburned residue, as an adiabatic system, through the consumption of heat released by combustion. The adiabatic flame temperature can be calculated as follows. Letting the amounts of heat released per hour by combustion of the siloxane and the combustion-assisting gas fed to the burner be respectively $Q_1$ and $Q_2$ (in units of kcal/h), the total heat of combustion Q is equal to the sum $Q_1+Q_2$. At the same time, letting the amounts of silica, steam, $CO_2$, $O_2$ and $N_2$ formed per hour as a product or by-product of combustion, or remaining unreacted, be respectively $N_1$, $N_2$, $N_3$, $N_4$ and $N_5$ (in units of mol/h), letting the corresponding specific heats be $Cp_1$, $Cp_2$, $Cp_3$, $Cp_4$ and $Cp_5$ (in kcal/mol·° C.), letting the adiabatic flame temperature be ta (in ° C.), and assuming room temperature to be 25° C., given that the total amount of heat released by combustion is equivalent to the total amount of heat consumed, we get $$Q=(N_1Cp_1+N_2Cp_2+N_3Cp_3+N_4Cp_4+N_5Cp_5)(ta-25).$$

The JANAF (Joint Army-Navy-Air Force) Thermochemical Tables indicate the standard enthalpy difference $H°_T-H°_{298}$ (kJ/mol) between an absolute temperature of T in degrees Kelvin (which is equal to the number of degrees Celsius+273) and an absolute temperature of 298 K (25° C.) for various chemical substances. By referring to these tables, and letting the heat quantity consumed per mole of a chemical substance in raising the temperature of the substance from 25° C. to t° C. (where t=T−273) be E (in kcal/mol), we get $$E=Cp(t-25)=(H°_T-H°_{298})\times 0.2389.$$

It should be noted here that 1 kJ=0.2389 kcal. Based on this formula, letting the amount of heat consumed per mole in raising the temperature of silica, steam, $CO_2$, $O_2$ and $N_2$ from 298 K (25° C.) to T K (where T=273 +t° C.) be respectively $E_1$, $E_2$, $E_3$, $E_4$ and $E_5$ (kcal/mol), the temperature at which $$Q=N_1E_1+N_2E_2+N_3E_3+N_4E_4+N_5E_5$$

is the adiabatic flame temperature ta.

The adiabatic flame temperature may be controlled by adjusting such factors as the type, feed rate, and feed ratio with oxygen of the siloxane. If the burner supplies a large amount of excess oxygen or of an inert gas such as nitrogen which does not take part in combustion, this lowers the flame temperature, increases the fineness of the silica particles, and compromises coalescence and growth among the particles, both resulting in the formation of agglomerates and increasing the load on the exhaust collection system. At an adiabatic flame temperature for combustion of the siloxane and the combustion-assisting gas, based on the siloxane, combustion-assisting gas and combustion-supporting gas fed to the burner, of lower than 1,600° C., the silica particles are very fine and fail to unite by coalescence and growth, becoming instead agglomerates. In addition, both the productivity and energy efficiency suffer. For these reasons, the adiabatic flame temperature must be at least 1,600° C. On the other hand, reducing the amount of inert gas and combustion-supporting gas raises the adiabatic flame temperature. The adiabatic flame temperature becomes highest when there is no inert gas and the combustion-supporting gas is supplied in an amount that is stoichiometric for oxygen. However, because combustion under such conditions is incomplete, the adiabatic flame temperature must be no higher than 5,600° C. Other than this, there are no limitations concerning the introduction of air or an inert gas such as nitrogen to prevent the deposition of powder on the walls of the combustion furnace or to cool the exhaust gases following combustion.

The furnace is operated under negative pressure by drawing off the exhaust with an exhaust unit such as a blower provided on the exhaust side of the furnace. The microparticulate silica product thus obtained by combustion is collected by means of a cyclone and bag filter provided along the exhaust route, after which the exhaust is discharged from the system by the exhaust unit. Because the siloxane contains no halogen, acidic corrosive gases such as hydrogen chloride do not form as by-products of combustion, eliminating the need to use special-grade materials in the various system components, such as the furnace proper, flue lines, collectors, recovery units, and exhaust unit. Nor is there any need for equipment to treat the exhaust. The silica particles thus produced are spherical in shape, contain substantially no halogen, and have a content of metallic impurities other than silicon of not more than 1 ppm, a particle size of 10 nm to 10 μm and a specific surface area of 3 to 300 m²/g.

The inventive spherical silica particles, which are made by burning a non-halogenated siloxane as the starting material, are substantially halogen-free and have a content of metallic impurities other than silicon of not more than 1 ppm, a particle size of 10 nm to 10 μm and a specific surface area of 3 to 300 m²/g. The spherical silica particles are thus endowed with excellent flow properties and deflashing properties when added as a filler to epoxy resins used in the plastic packaging of IC devices, and have the excellent flow and other qualities essential for use as an internal additive in toners.

Figure 2:
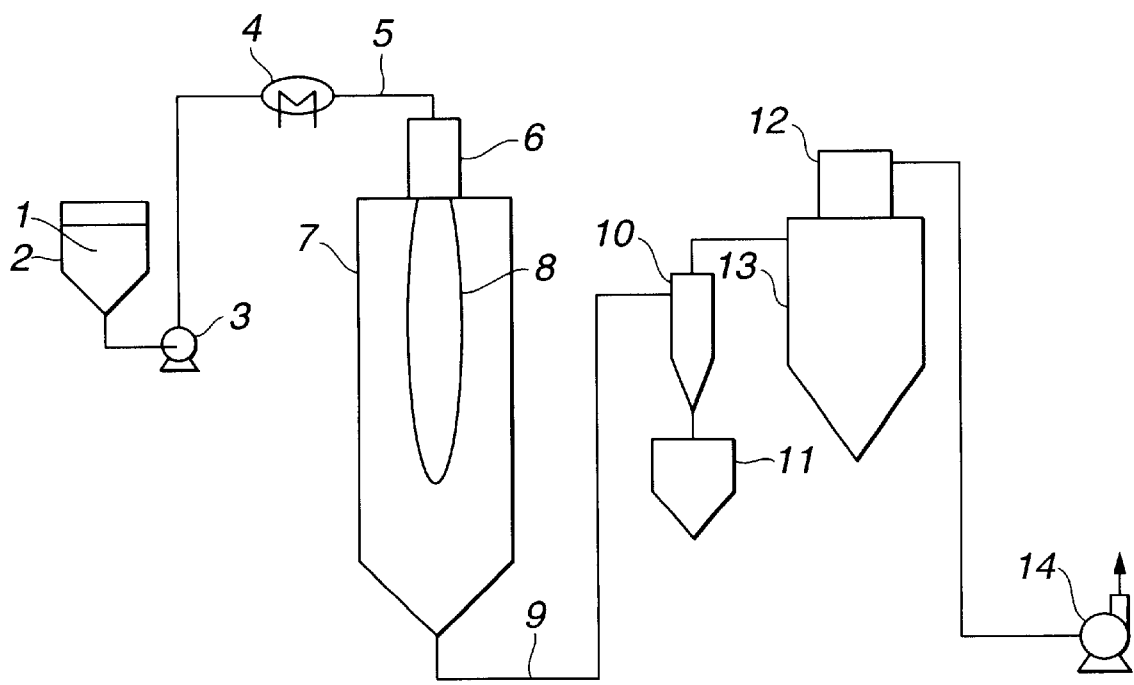
FIG. 2 is a schematic sectional view showing another exemplary reaction system used in the invention.

Referring to the drawings, the reaction apparatus used to manufacture the spherical silica particles of the invention is now described. FIGS. 1 and 2 show schematic sectional views of different examples of production systems suitable for this purpose. FIG. 1 illustrates a production method in which the siloxane is fed to the burner in liquid form and subjected to oxidative combustion in a flame. FIG. 2 illustrates a production example in which the siloxane is fed to the burner as a vapor and subjected to oxidative combustion in a flame. In FIG. 1, a siloxane starting material 1 is passed by a metering pump 3 from a starting material tank 2 through a feed line 5 and to a main burner 6 equipped with an atomizing nozzle (not shown) at the end thereof. The siloxane 1 is atomized within a combustion furnace 7, where it is ignited by an auxiliary flame, thereby forming a combustion flame 8. The silica particles formed by combustion are cooled together with the exhaust in a flue line 9, separated off by a cyclone 10 and a bag filter 12, and collected in recovery units 11 and 13. The exhaust is then discharged by an exhaust unit 14. The production system shown in FIG. 2 is like that in FIG. 1, except that a vaporizer 4 is provided on the line feeding the starting siloxane 1 to the main burner 6, and an atomizing nozzle is not used.

EXAMPLES

Examples and comparative examples are given below by way of illustration and not by way of limitation.

Examples 1 to 3

Hexamethyldisiloxane was fed at room temperature and in a liquid state to a burner 6 provided at the top of a vertical combustion furnace like that shown in FIG. 1. The hexamethyldisiloxane was atomized as a fine mist using air as the atomizing medium by an atomizing nozzle mounted at the tip of the burner 6, and combustion was induced by a propane-burning auxiliary flame. Oxygen and air were fed from the burner 6 as combustion-supporting gases. The feed rates of the hexamethyldisiloxane, atomizing air, propane, oxygen and combustion-supporting air in each example are shown in Table 1, as are also the respective adiabatic flame temperatures. Table 2 shows how the adiabatic flame temperature was calculated in Example 1. The silica particles thus produced were collected using a cyclone 10 and a bag filter 12. The collected silica particles had a chlorine content of less than 0.1 ppm, as measured by ion chromatography. The content of metallic impurities other than silicon, as measured by atomic absorption spectrometry, was less than 1 ppm, including metals such as iron, aluminum and calcium. The particle size was measured using transmission electron microscopy. The particle shapes on the resulting micrographs were analyzed using a particle shape analyzer (Luzex F, manufactured by Nireco Co., Ltd.), from which all the particles were found to be spherical with a breadth-to-length ratio of at least 0.85. Particle sizes and specific surface areas measured for the products obtained in examples are given in Table 1.

TABLE 1

| Type of siloxane | Siloxane feed rate (kg/h) | Atomizing air feed rate (Nm³/h) | Propane feed rate (Nm³/h) | Oxygen feed rate (Nm³/h) | Air feed rate (Nm³/h) | Adiabatic flame temp. (° C.) | Silica particle size (μm) | Silica specific surface area (m²/g) |
|---|---|---|---|---|---|---|---|---|
| EX 1 hexamethyl-disiloxane | 6.0 | 2.5 | 0.3 | 15.0 | 10.0 | 3,690 | 0.05–1.0 | 25 |
| EX 2 hexamethyl-disiloxane | 7.0 | 0 | 0.3 | 14.4 | 0 | 5,530 | 0.3–10 | 3 |
| EX 3 hexamethyl-disiloxane | 7.0 | 4.0 | 0.3 | 14.4 | 25.0 | 2,740 | 0.02–0.2 | 80 |

TABLE 2

Calculation of adiabatic flame temperature in Example 1.

Heat Released by Combustion

| Fuel | Feed rate (mol/h) | Heat of combustion (kcal/mol) | Amount of heat released by combustion (kcal/h) |
|---|---|---|---|
| Hexamethyldisiloxane | 36.94 | 1,389 | 51,310 |
| Propane | 13.39 | 488 | 6,530 |
| Total | | | 57,840 |

Heat Consumed

| Products and unreacted substances | Amount formed N (mol/h) | E (kcal/mol) 25° C. → 3,690° C. | Amount of heat consumed NE (kcal/h) |
|---|---|---|---|
| Silica | 73.9 | 69.28 | 5,120 |
| Nitrogen | 440.8 | 30.74 | 13,550 |
| Oxygen | 276.8 | 32.80 | 9,080 |
| Carbon dioxide | 261.8 | 50.95 | 13,340 |
| Steam | 386.0 | 43.39 | 16,750 |
| Total | | | 57,840 |

Examples 4 to 6

Hexamethyldisiloxane was fed to a vaporizer 4 like that shown in FIG. 2, where it was vaporized and mixed with nitrogen, then fed to a burner 6 and induced to burn by a hydrogen-burning auxiliary flame. The feed rates of the hexamethyldisiloxane, nitrogen, hydrogen, oxygen and air fed from the burner 6 in each example are shown in Table 3, as are also the respective adiabatic flame temperatures. Aside from the above, silica particles were produced in the same way as described in Example 1. The particles were spherical in shape, with a breadth-to-length ratio of at least 0.85. The halogen content in each case was less than 0.1 ppm, and the metallic impurities content was less than 1 ppm. Particle sizes and specific surface areas measured for the products obtained in the respective examples are given in Table 3.

TABLE 3

| Type of siloxane | Siloxane feed feed rate (kg/h) | Mixing nitrogen rate (Nm³/h) | Hydrogen feed rate (Nm³/h) | Oxygen feed rate (Nm³/h) | Air feed rate (Nm³/h) | Adiabatic flame temp. (° C.) | Silica particle size (μm) | Silica specific surface area (m²/g) |
|---|---|---|---|---|---|---|---|---|
| EX 4 hexamethyldisiloxane | 6.0 | 4.0 | 1.0 | 13.0 | 0 | 4,760 | 0.1–3.0 | 8 |
| EX 5 hexamethyldisiloxane | 5.0 | 5.0 | 1.2 | 15.0 | 20.0 | 2,480 | 0.01–0.1 | 110 |
| EX 6 hexamethyldisiloxane | 4.0 | 6.0 | 1.0 | 15.0 | 30.0 | 1,760 | 0.01–0.03 | 300 |

Comparative Example 1

Aside from using air as the combustion-supporting gas fed from the burner 6 and setting the adiabatic flame temperature below 1,600° C., hexamethyldisiloxane was atomized and burned in the same way as in Example 1 to produce silica particles, which were then collected. The feed rates of the hexamethyldisiloxane, atomizing air, propane, oxygen and combustion-supporting air fed from the burner 6 are shown in Table 4, as is also the adiabatic flame temperature. The halogen content was less than 0.1 ppm, and the metallic impurities content was less than 1 ppm. However, the particles were in the form of agglomerates of partially bonded 10 nm primary particles.

TABLE 4

| Type of siloxane | Siloxane feed rate (kg/h) | Atomizing air feed rate (Nm³/h) | Propane feed rate (Nm³/h) | Oxygen feed rate (Nm³/h) | Air feed rate (Nm³/h) | Adiabatic flame temp. (° C.) | Silica particle size (μm) | Silica specific surface area (m²/g) |
|---|---|---|---|---|---|---|---|---|
| CE 1 hexamethyldisiloxane | 3.0 | 5.0 | 0.3 | 20.0 | 30.0 | 1,490 | 0.01 (agglomerates) | 300 |

As described above and illustrated in the foregoing examples, substantially halogen-free, high-purity non-crystalline silica particles can be produced by making use of a purified non-halogenated siloxane as the starting material. Moreover, the high combustion flame temperature and the large number of core silica particles that form promote the coalescence and growth of silica particles, making it possible to achieve spherical silica particles having a particle size of 10 nm to 10 μm and a specific surface area of 3 to 300 m²/g.

Japanese Patent Application No. 2000-246132 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. Spherical, non-crystalline silica particles made by burning a non-halogenated siloxane starting material, which particles are substantially halogen-free and have a content of metallic impurities other than silicon of not more than 1 ppm, a particle size of 10 nm to 10 μm and a specific surface area of 3 to 300 m²/g.

2. A method of producing the spherical silica particles of claim 1 by subjecting the non-halogenated siloxane to oxidative combustion in a flame, in which method, based on the siloxane, a combustion-assisting gas and a combustion-supporting gas fed to a burner, the siloxane and the combustion-assisting gas when burned have an adiabatic flame temperature within a range of 1,600° C. to 5,600° C.

3. The method of claim 2, wherein combustion is carried out by feeding the siloxane to the burner in liquid form and atomizing it with a nozzle mounted on the burner.

4. The method of claim 2, wherein combustion is carried out by heating the siloxane to form a vapor and feeding the vapor to the burner.

5. A method of producing spherical silica particles comprising the steps of:

feeding a non-halogenated siloxane to the top of a combustion zone housing a flame having an adiabatic flame temperature of 1,600° C. to 5,600° C. thereby producing hot silica droplets;

causing the hot silica droplets to coalesce into hot spherical particles having a diameter of 10 nm to 10 μm and a specific surface area of 3 to 300 m²/g while the hot silica particles are downwardly falling toward the bottom of the combustion zone under the influence of gravity;

cooling the hot spherical particles while the hot silica particles are continuing to downwardly fall toward the bottom of the combustion zone under the influence of gravity to form cooled spherical particles;

recovering the cooled spherical particles.

6. The process of claim 5, wherein the non-halogenated siloxane is an atomized liquid.

7. The process of claim 5, wherein the non-halogenated siloxane is a vapor.

8. The process of claim 5, wherein the combustion zone is enclosed.

9. The process of claim 5, wherein the combustion zone is free of a mandrel.

* * * * *